No. 704,252. Patented July 8, 1902.
H. K. HESS.
PROCESS OF MAKING PLATES FOR STORAGE BATTERIES AND PRODUCT THEREOF.
(Application filed July 30, 1901.)
(No Model.) 2 Sheets—Sheet 2.
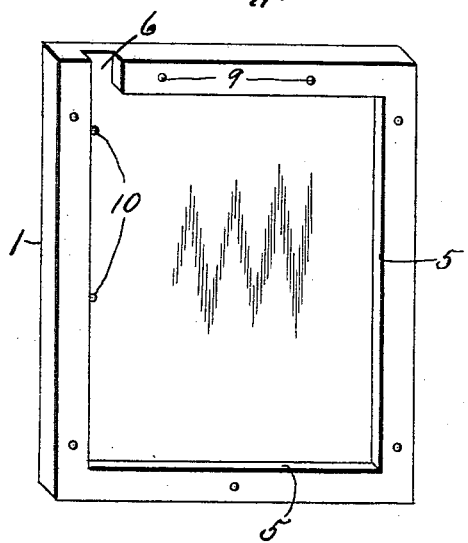
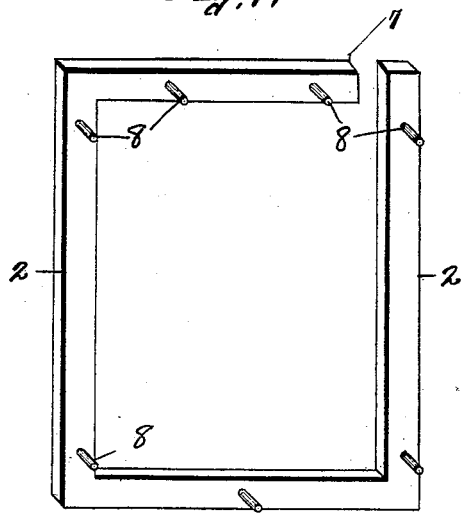
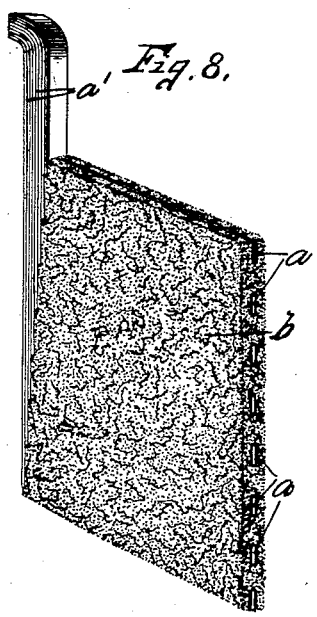
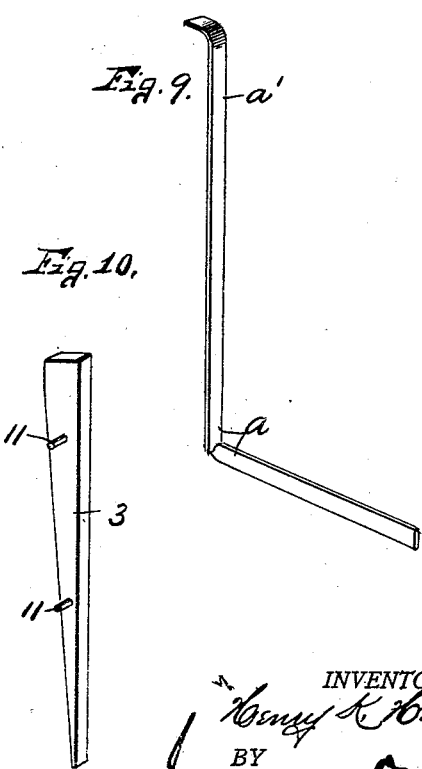
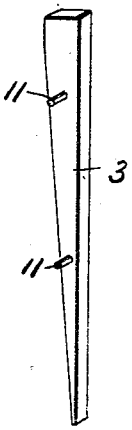
WITNESSES:
INVENTOR
Henry K. Hess
BY
Smith &
ATTORNEYS.

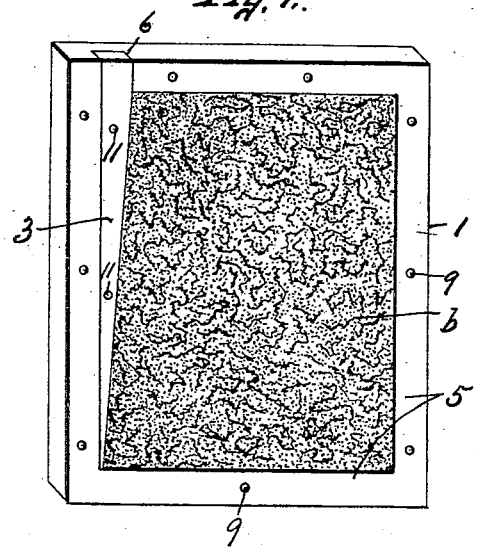
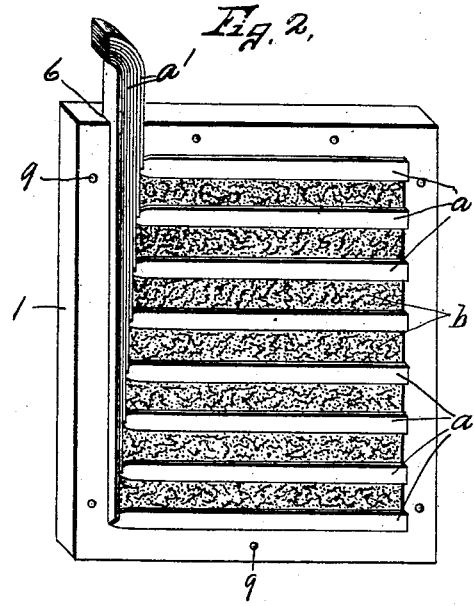
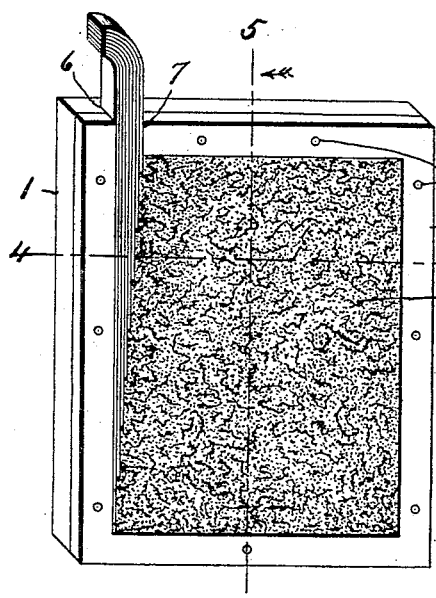
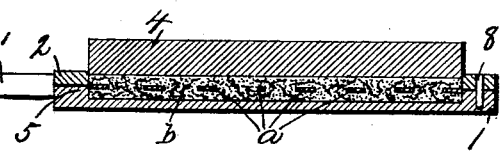

UNITED STATES PATENT OFFICE.

HENRY K. HESS, OF PHILADELPHIA, PENNSYLVANIA.

PROCESS OF MAKING PLATES FOR STORAGE BATTERIES AND PRODUCT THEREOF.

SPECIFICATION forming part of Letters Patent No. 704,252, dated July 8, 1902.

Application filed July 30, 1901. Serial No. 70,273. (No specimens.)

*To all whom it may concern:*

Be it known that I, HENRY K. HESS, of Philadelphia, in the county of Philadelphia, in the State of Pennsylvania, have invented new and useful Improvements in Art or Process of Manufacture of Plates for Electric Batteries, of which the following, taken in connection with the accompanying drawings, is a full, clear, and exact description.

This invention relates to improvements in the art or process of manufacture of plates for electric batteries, relating more particularly to plates for storage batteries.

The object of my invention is to simplify the method of manufacture of storage-battery plates, and to thereby reduce the cost of production.

Another object is to construct the electrode in such a manner as to prevent buckling and consequent disintegration of the plate when in use.

A further object is to increase the storage capacity of the plate and to obviate the use of any confining grid or other support.

To this end the invention consists in the various steps in the art or method of manufacturing storage-battery plates, as hereinafter fully described, and pointed out in the claims.

In carrying out my process I preferably employ a suitable apparatus, as seen in the drawings, in which—

Figure 1 represents a section of a mold for receiving a quantity of active material and a series of metal strips. Fig. 2 is a similar view of the mold seen in Fig. 1, the tapering strip or form being removed and the metal strips being placed in position. Fig. 3 is a view of the complete mold, showing the active material and metal strips therein just previous to compressing the same. Figs. 4 and 5 are sectional views, taken, respectively, on lines 4 4 and 5 5, Fig. 3, showing a suitable die or pressure-plate operatively compressing the active material and strips into an inherent mass. Figs. 6 and 7 are isometric views, respectively, of the mold and removable section of the mold. Fig. 8 is a perspective view of the complete battery-plate after being formed or compressed. Figs. 9 and 10 are isometric views, respectively, of one of the detached metal strips and the wedge or tapering section of the mold.

Similar reference characters indicate corresponding parts in all the views.

As seen in the drawings, this mold consists of a frame 1, preferably of rectangular form, a second frame or section 2, similar in form to the section 1, a tapering or wedge-shaped section 3, and a pressure-bar or die 4. The frame 1 is provided with a perimetric flange, forming a suitable chamber for the active material, and metal strips, one side of the flange 5 being formed with a cut-out or recess 6 for receiving one end of the tapering section 3 and holding the same in position. The section 2 preferably consists of an open frame of substantially the same dimensions as the flange 5 of the section 1, one of its inclosing walls being also provided with a cut-out or opening 7, alined with the recess 6 when the two sections are placed in operative position. One of the sections, as the section 2, is provided with a series of pins 8, projecting from one of its side faces and adapted to enter sockets 9 in the other section, as 1, this latter section 1 being formed with additional sockets 10 for receiving pins 11, provided on the section 3, whereby the section 3 is additionally interlocked with the section 1.

*a* represents a series of separate metal strips, Figs. 2, 3, 8, and 9, and *b* represents a body of active material or material adapted to become active, the method or process of combining these plates with the active material forming the subject-matter of my present application.

This process consists, broadly, in combining the metal plates and plastic active material, as lead oxid or spongy lead, in a suitable mold, as seen in the drawings, and then compressing the combined elements within the mold by a suitable pressure-piece or die 4, Figs. 4 and 5, the pressure being sufficient to form the metal strips and active material into a substantially self-supporting plate having a large storage capacity and being entirely free to expand or contact in any direction when in use, thereby preventing the buckling and consequent disintegration of the plate.

The various steps of the process are as follows: The tapering section 3 is first placed in position, as seen in Fig. 1, and the active material is filled in the chamber of the section 1 substantially even with its top face. The tapering section 3 is then removed and the metal strips *a* are then arranged with their upright portions in contact in the space formed by the removal of the section 3, and their horizontal portions are disposed in separated relation to and substantially parallel with each other, as seen in Fig. 2, their end edges being in close proximity to the adjacent wall of the perimetric flange 5. The section 2 is then placed in position, as seen in Fig. 3, and an additional quantity of active material is placed in the opening in the latter section until said opening is entirely filled. The die or pressure-plate 4 is then operated to compress the active material and metal strips together into a firm coherent and adherent mass. The die is then withdrawn, the section 2 is removed, and the plate thus formed is ready for use, as seen in Fig. 8.

As previously stated, the essential features of novelty of this application consist in the process or method of making electric-battery plates by combining a plurality of separate metal strips with a body of the active material or material adapted to become active and then compressing the combined elements into a compact integral self-supporting body.

The various steps in the art or method of manufacturing storage-battery plates will now be readily understood upon reference to the foregoing description and the accompanying drawings, and it will be evident that other forms of molds other than that seen in the drawings may be employed for making different forms of battery-plates. Therefore I do not limit myself to the specific form of mold nor to the employment of a tapering wedge or key for leaving a space for the terminals of the metal strips.

Having thus described my invention, what I claim, and desire to secure by Letters Patent, is—

1. The process for forming an electric-battery plate consisting, first, in mechanically applying an active material or material to become active to the back piece of a suitable mold; second, arranging portions of a series of separate metal strips against the material in separated relation and other portions in sliding contact; third, applying mechanically extra active material or material to become active to the exposed surfaces of said separated portions of the strips so that the separated portions of the strips are concealed, and then compressing the active material so as to form a self-supporting mass to hold the strips in position.

2. A product of the herein-described process consisting of an electrode composed of outer layers of active material or material to become active and metal strips having portions separated and concealed in the material, portions exposed and protruding from said material and arranged in sliding contact for the purpose described.

3. The art or method of making plates for storage batteries consisting, first, in spreading active material or material to become active on a suitable support to form a layer of substantially uniform thickness, then arranging portions of independent strips of metal on said layer in separated relation and other portions in sliding contact, then mechanically applying an additional layer of the same material to the exposed surfaces of said separated portions of the strips so as to conceal the separated portions of the metal strips.

In witness whereof I have hereunto set my hand this 26th day of July, 1901.

HENRY K. HESS.

Witnesses:
WM. A. SHRYOCK,
ROBERT MAYER.